United States Patent
Sayce et al.

[11] 3,710,124
[45] Jan. 9, 1973

[54] OPTICAL MEASURING APPARATUS COMPRISING OSCILLATOR AND PHASE COMPARATOR

[75] Inventors: Leonard Alfred Sayce; Knut Indergaard Jespersen, both of Glasgow, Scotland

[73] Assignee: National Research Development Corporation, London, England

[22] Filed: March 18, 1971

[21] Appl. No.: 125,643

[30] Foreign Application Priority Data

March 25, 1970 Great Britain......................14,533/70
July 20, 1970 Great Britain......................35,141/70

[52] U.S. Cl.................250/206, 250/237 G, 356/169
[51] Int. Cl..........................H01j 39/12, G01b 11/04
[58] Field of Search....250/237 G, 206; 356/167, 169

[56] References Cited
FOREIGN PATENTS OR APPLICATIONS 928,564  6/1963  Great Britain.......................356/167

209,077  11/1966  Sweden..................................356/169

Primary Examiner—James W. Lawrence
Assistant Examiner—T. N. Grigsby
Attorney—Cushman, Darby and Cushman

[57] ABSTRACT

In apparatus for measuring displacement, a scale grating is secured to an object whose displacement is to be measured and a real or simulated index grating is periodically vibrated through a distance equal to a constant fraction of the grating spacing. Collimated light falling successively on the two gratings is directed on to a photoelectric element. The phase of the alternating output signal from the photoelectric element relative to the phase of the periodic movement of the index grating provides a measure of the displacement of the scale grating relative to the mean position of the index grating.

12 Claims, 8 Drawing Figures

OPTICAL MEASURING APPARATUS COMPRISING OSCILLATOR AND PHASE COMPARATOR

The present invention relates to optical apparatus for measuring linear or angular displacement of one member relative to another.

In one such apparatus of a known kind, the displacement to be measured is arranged to take place between a movable diffraction grating, known as the scale grating, and a reference assembly known as the reading head. Light from a source on the reading head is transmitted by or reflected from the diffraction grating (depending on the type of grating), and passes through a second diffraction grating mounted on the reading head and known as the index grating. The light from the index grating falls on a photo-electric element such as a photocell, and the arrangement is such that the output of the photocell varies cyclically with displacement of the scale grating relative to the reading head, to give a measure of such displacement.

In this specification the term light includes infra-red and ultra-violet radiation. The term grating does not imply that diffraction effects are necessarily utilized, but refers to the configuration of the structure which is similar to that of a conventional diffraction grating.

Commonly both the scale grating and the index grating are transmissive gratings, that is of the kind consisting of a succession of opaque elements separated by transparent spaces. In this case, in a typical arrangement light from a straight filament lamp is collimated by a lens and caused to be incident normally upon the scale grating. After traversing the scale grating and the index grating the light impinges upon the photocell.

Alternatively, the scale grating may be formed upon an opaque base, such as steel, in which case the scale grating consists of a succession of specularly-reflecting lines separated by diffusely reflecting or non-reflecting spaces. As such a scale grating is opaque, the light reaching the photocell is reflected by the specular portions of the scale grating rather than being transmitted through the grating.

In both these kinds of measuring apparatus, the displacement of the scale grating is obtained by measurements of variations in amplitude of the photocell, including both the number of full cycles of amplitude variation, and fractions of a cycle of variation being measured. The limitation on accuracy of the apparatus is thus determined by random amplitude variations in, for example, the transmission or reflection of the grating, and in the light source.

According to the present invention there is provided apparatus for measuring displacement comprising a scale grating, a real or simulated index grating, a source of collimated light which is directed on to the scale grating thence to fall on or to form the index grating, a photo-electric element positioned to receive light from the index grating, and means for effecting periodic movement of the index grating in the plane thereof through a distance equal to a constant fraction of the grating spacing to produce an alternating output signal from the photo-electric element, the arrangement being such that the phase of the alternating output signal relative to the phase of the periodic movement of the index grating varies with displacement of the scale grating relative to the mean position of the index grating and provides a measure of such displacement.

According to one aspect of the invention, the index grating is real. In this case, apparatus in accordance with the invention comprises a scale grating, an index grating, a source collimated light which is directed on to the scale grating and thence on to the index grating, a photoelectric element positioned to receive light from the index grating and means for effecting periodic movement of the index grating in the plane thereof through a distance equal to a constant fraction of a grating spacing to produce an alternating output signal from the photoelectric element, the arrangement being such that the phase of the alternating output signal relative to the phase of the periodic movement of the index grating varies with displacement of the scale grating relative to the mean position of the index grating and provides a measure of such displacement.

Alternatively, in accordance with another aspect of the invention, the index grating may be virtual or simulated. In this case, it may consist of an image of the scale grating produced by a rotationally oscillating mirror.

In accordance with this aspect of the present invention, there is provided apparatus for measuring displacement comprising a scale grating, a source of collimated light directed on to the scale grating and thence on to a mirror positioned to reflect the light on to the scale grating a second time, a photo-electric element positioned to receive the light leaving the scale grating the second time to form an image of the scale grating on the scale grating and means for rotationally oscillating the mirror through an amplitude such that said image of the scale grating moves periodically through a distance equal to a constant fraction of a grating spacing to produce an alternating output signal from the photo-electric element, the arrangement being such that the phase of the alternating output signal relative to the phase of the oscillation of the mirror varies with displacement of the scale grating relative to the axis of rotation of the mirror and provides a measure of such displacement.

Preferably there is provided means for focusing the collimated light from the scale grating on to the mirror which is placed at the focal point of the focusing means, the returning light from the mirror being collimated again by the focusing means before passing a second time through the scale grating.

Preferably, the light from the light source is incident on an inclined partially reflecting mirror before passing through the scale grating the first time, and the light is incident on the reverse side of the partially reflecting mirror after passing through the scale grating the second time, and before passing to the photo-electric element.

Thus there is provided apparatus for measuring relative displacement between a scale grating and a reading-head in which, instead of the usual index grating, a reversed image of the scale grating is projected back upon the said scale grating by means of the small rotationally oscillating mirror placed at the principal focus of the focusing means. The photocell is arranged to receive light resulting from the interaction of the scale grating with its own reversed image. By this arrangement the phase of the alternating output signal from the photocell relative to the phase of the oscillation of the oscillating mirror varies with displacement of the scale grating relative to the reading-head. The use of the reversed image of the scale grating as the index grating causes in effect a doubling of the lines of the scale grating, since its image moves in the reverse direction to the grating itself. Thus for example, a scale grating having 100 lines per inch produces 200 cycles of phase variation if it is moved one inch relative to the reading head.

It is an advantage of the present invention that the measurement of the phase of the output of the photo-electric element rather than the amplitude allows more accurate determination of scale grating displacements within one cycle of output variation. This arises because random amplitude variations in the light received by the photocell have a substantially negligible effect upon the phase of the output signal.

Embodiments of the invention will now be described by way of example with reference to the accompanying drawings in which.

Figure 1:
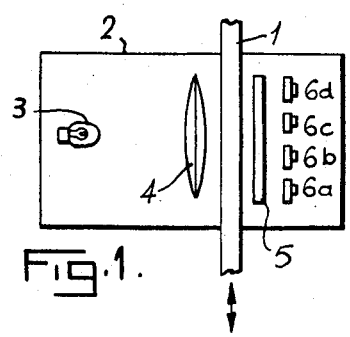
FIG. 1 shows a diagrammatic representation of a known optical measuring apparatus.
Figure 2:
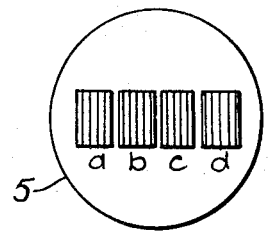
FIG. 2 shows a detail of an index grating of FIG. 1.

Referring firstly to FIGS. 1 and 2 there is illustrated a commonly used linear grating measuring system. In this, a linear scale grating 1, moves perpendicularly relative to a reading head 2, which carries a lamp 3, a collimating lens 4, an index grating 5, and four photocells 6a, 6b, 6c and 6d. The index grating 5 shown in greater detail in FIG. 2, consists of four ruled segments, a, b, c and d, the rulings of which are of the same pitch as the rulings of the linear scale grating 1, and are parallel thereto. The rulings of segments b, c and d are displaced laterally by ½, ¼ and ¾ pitch respectively in relation to segment a, and the four photocells, 6a, 6b, 6c and 6d receive light through segments a, b, c and d respectively. The photo-voltaic cells 6a and 6b are connected together in parallel with their outputs in opposition, as also are photocells 6c and 6d. As a result of the above arrangement, movement of the linear grating 1 relative to the reading-head 2 results in two alternating signals in quadrature one with the other, one signal being derived from photocells 6a and 6b and the other signal from photocells 6c and 6d. These signals are then applied to a reversible electronic counter (not shown) the readings of which are indicative of the traverse of the linear grating with respect to the reading head 2.

In such a grating measuring system employing a stationary index grating, the required linear measurement is derived from the amplitude of the photo-electric signals. Not only may displacement be measured by the number of rulings traversed by the scale grating in passing from one position to another but, also, by subdivision of the maximum variation in amplitude, the extent of traverse may be measured to a fraction of the grating spacing. Although, under ideal conditions, this fraction can be as small as one thousandth, in engineering practice this fraction is usually limited to a tenth or a twentieth by reason of random variations in, for example, the transmission of the linear grating or in the light emitted by the lamp.

The present invention relates to a simple apparatus for causing the transverse linear movements of the scale grating in relation to the reading-head to produce photo-electric signals the phase of which varies with respect to a constant frequency. By this means, random variations in the amplitude of the photo-electric signals are of substantially no consequence and reliable measurements of the movements of the scale grating may be made to an accuracy in the region of a thousandth of the grating spacing.

Figure 3:
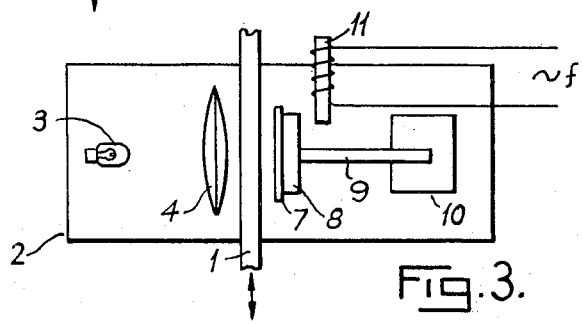
FIG. 3 shows an optical measuring apparatus embodying the invention, in which a real index grating is used.

The principal part of an apparatus embodying the invention consists of a reading-head shown diagrammatically in FIG. 3. Elements corresponding to those of FIG. 1 are indicated by like reference numerals. As in FIG. 1, the linear scale grating 1, moves transversely with respect to the reading-head 2 which carries a lamp 3, and collimating lens 4. The index grating 5 and four photocells 6a, 6b, 6c and 6d shown in FIG. 1 are replaced in FIG. 3 by an index-grating 7 rigidly attached to a single photocell 8, mounted at the end of a leaf-spring 9, the other end of which is clamped to a rigid support 10. The index grating 7 has the same area as the photocell 8, and its whole surface bears rulings of the same spacing as the rulings on the grating 1, and parallel thereto.

The combined index grating and photocell is maintained in vibration at a frequency $f$ by means of an electro-magnet 11 having a polarized core. The amplitude of vibration may be controlled at a constant value, between one-half and three-quarters of the grating spacing, by suitable choice of the current supplied to the electromagnet 11. Under these conditions, and depending on the position of the scale grating, the output from the photocell 8 alternates either at a frequency $f$ or a frequency $2f$ or, in various intermediate positions of the grating 1, at $2f$ and $f$ in various proportions. Harmonics of these frequencies are also present.

By electronic means to be described hereafter, the photocell output may be so treated that the $2f$ frequency is halved and added to the $f$ frequency, thus producing an output of frequency $f$. If the scale grating 1 is stationary, this modified photocell output will bear a fixed phase relationship to the current exciting the electromagnet 11. If the scale grating 1 is moved transversely, the modified photocell output will alter in its phase relationship to the electro-magnet exciting current by one complete phase for every line spacing moved, and by a fraction of a phase for a similar fraction of a line spacing moved. As phase comparisons of this kind can readily be performed by known art to an accuracy of a thousandth of a phase, linear measurements may be made reliably in the region of a thousandth of a grating space.

Figure 4:
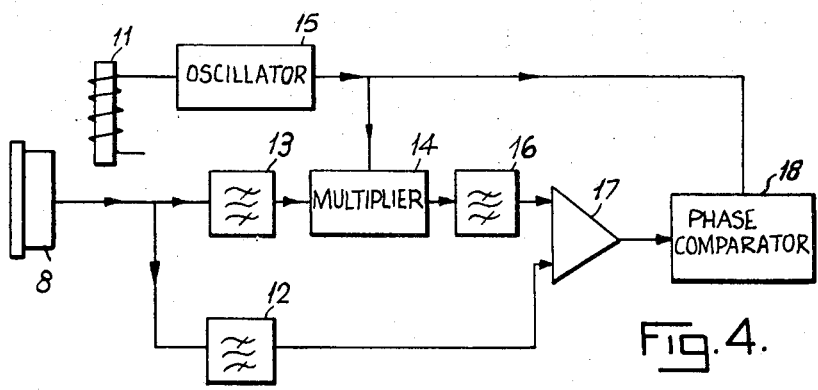
FIG. 4 is a block circuit diagram of one circuit for detecting phase changes of an output signal due to displacements to be measured.

One circuit for processing the photo-electric output is shown diagrammatically in FIG. 4 where 12 and 13 are band-pass filters tuned to accept signals of the frequencies $f$ and $2f$ respectively from the photocell 8. The $2f$ component, passed by band-pass filter 13, is fed to an electronic multiplier 14, together with a current of frequency $f$ from an oscillator 15 which also supplies the electro-magnet 11. The output of the multiplier 14 passes to a band-pass filter 16 tuned to frequency $f$. The output of the filter 16 together with the output of the filter 12 is fed to a summing amplifier 17 the output signal of which is fed to a phase comparator 18, where its phase is compared with that of the oscillator 15.

Figure 5:
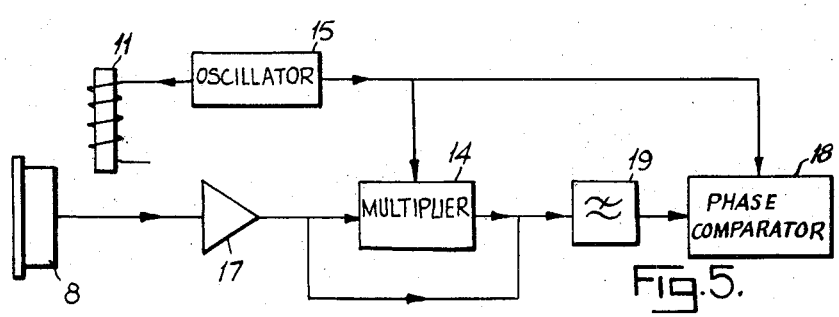
FIG. 5 is a block circuit diagram of an alternative circuit to that of FIG. 4.

Alternatively, the electronic circuitry shown in FIG. 4 may be replaced by a simplified circuit shown in FIG. 5, in which the three band-pass filters 12, 13 and 16 of FIG. 4 are replaced by one low-pass filter 19 tuned to reject signals of the frequency $2f$ and above.

Figure 6:
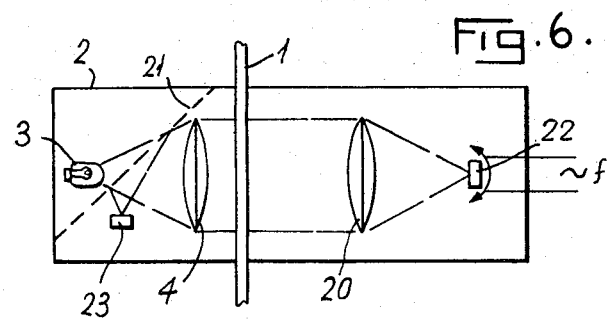
FIG. 6 shows an optical measuring apparatus embodying the invention, in which a simulated index grating and a transmission scale grating are used.

The principal part of another embodiment of the invention, embodying a virtual index grating, consists of a reading-head shown diagrammatically in FIG. 6. Elements corresponding to those of FIG. 3 are indicated by like reference numerals.

As in FIG. 3 the linear scale grating 1 moves transversely with respect to the reading-head 2 which carries a lamp 3, and collimating lens 4. The index grating 7, photocell 8, leaf spring 9 and electro-magnet 11 shown in FIG. 3 are replaced in FIG. 6 by a second lens 20, a semi-reflecting mirror 21, a rotationally oscillating mirror 22 and a photocell 23.

Light from the lamp 3 traverses the semi-reflecting plane mirror 21 and is collimated by the lens 4 from which it passes through the grating 1 to the second lens 20 which focuses it upon the rotationally oscillating plane mirror 22. The light reflected from this oscillating mirror is collimated by the lens 20 and passes again through the grating 1. After passing through the lens 4, the light strikes the semi-reflecting mirror 21, and is brought to a focus upon the photocell 23.

The mirror 22 is maintained in rotational oscillation at a frequency $f$, at a constant amplitude such that the reversed image of the scale grating projected back upon the scale grating traverses between one-half and three-quarters of the grating spacing. A convenient and readily available means of obtaining and driving the mirror 22 is to use a miniature tubular moving coil galvanometer unit such as are used in commercial Ultraviolet Recorders, which enable the mirror to be maintained in stable oscillation at any frequency up to 10,000 hertz.

Figure 7:
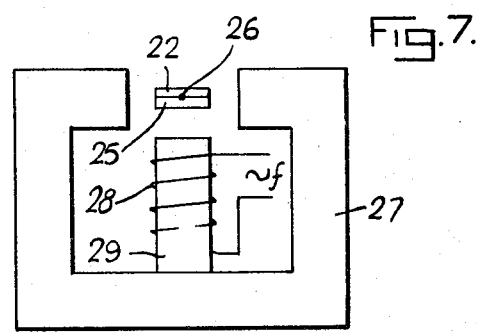
FIG. 7 is a schematic diagram of a moving iron mirror oscillator for use in conjunction with the apparatus of FIG. 6.

An alternative way of driving the mirror 22 is to use a moving iron mirror oscillator as shown in FIG. 7. Briefly, the mirror 22 is mounted on a soft iron armature 25 which is suspended from a taut steel filament 26 between the poles of a "horse shoe" permanent magnet 27. An electro-magnet 28 is mounted with its soft iron core 29 having one end secured to the neutral central region of the horse shoe magnet and the other end confronting the armature. The effect of the electro-magnet 28 is to distort the field produced by the permanent magnet 27 so that, in the vicinity of the armature, the field is rotated in a direction dependent on the polarity of the electro-magnet. Consequently, if the electro-magnet 28 is energized with an alternating current, the armature 26, and the mirror 22 which is mounted thereon, oscillate at the frequency of the applied current about a mean position which is as shown in FIG. 7.

The amplitude of oscillation of the mirror 22 is determined in accordance with the amplitude of movement of the virtual index grating which is required, and the focal length of the lens 20. By way of example the amplitude of movement of the virtual index grating may be three-fourths of a grating spacing, and this may correspond to a rotational amplitude of a few seconds of arc at the mirror.

Under these conditions and depending on the position of the scale grating, the output from the photocell 23 alternates at a frequency $f$ or a frequency $2f$ or, in various intermediate positions of the grating 1, at $2f$ and $f$ in various proportions. Harmonics of these frequencies are also present.

By electronic means which may be as shown in either FIG. 4 or FIG. 5, the photocell output may be so treated that the $2f$ frequency is halved and added to the $f$ frequency, thus producing an output of frequency $f$. As with the embodiment shown in FIG. 3, if the scale grating 1 is stationary, this modified photocell output will bear a fixed phase relationship to the current exciting the oscillating mirror 22. If the scale 1 is moved transversely, the modified photocell output will alter in its phase relationship to the oscillating mirror exciting current by two complete phases for every line spacing moved, and by a fraction of a phase for a similar fraction of a half line spacing moved. As phase comparisons of this kind can readily be performed by known art to an accuracy of a thousandth of a phase, linear measurements may be made reliably in the region of a two thousandth of a grating space.

The above description of the invention has referred, for simplicity of explanation, to its use for the purpose of linear measurement employing a linear grating. However, the invention is equally applicable to angular or radial measurement, for which purpose the linear grating 1 of FIG. 3 or FIG. 6 is replaced by a radial grating.

Further, the above description has been concerned with the use of a transmission grating for the scale grating. The invention may be applied equally in the use of reflection gratings, either linear or radial. When a real index grating is used the index grating 5 and the photocell 6 of FIG. 3 may be replaced by a photo-electric index grating, such as described in co-pending application Ser. No. 883,877, now U.S. Pat. No. 3,600,588 and the lamp 3, and collimating lens 4 are disposed as described in the said Patent application.

Figure 8:
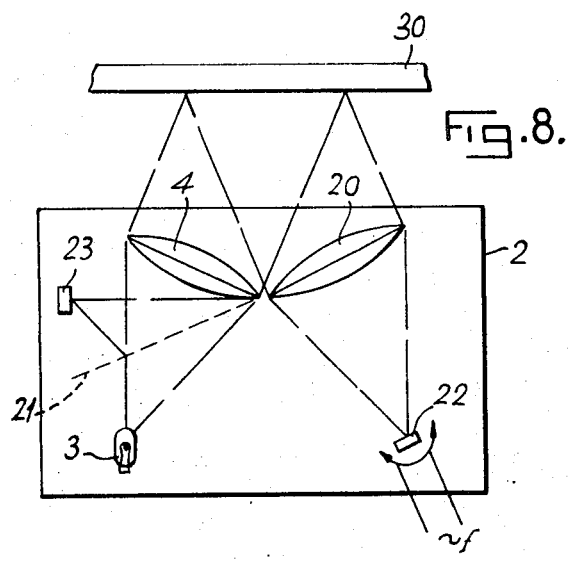
FIG. 8 shows an optical measuring apparatus embodying the invention, in which a simulated index grating and a reflection scale grating are used.

FIG. 8 shows apparatus which enables a virtual index grating to be used in conjunction with a reflection scale grating. The arrangement is basically similar to that shown in FIG. 6, corresponding elements being indicated by light reference numerals. As before, a linear scale grating 30 moves transversely with respect to the reading head 2 but, on this occasion, the grating 30 is a reflection grating. Light from the lamp 3 on the reading head 2 traverses the semi-reflecting plane mirror 21 and is collimated by the lens 4 from which it is directed obliquely on to the scale grating 30. The reflected light from the scale grating 30 is focused by the second lens 20 on to the rotationally oscillating plane mirror 22. The light reflected from this oscillating mirror is collimated by the lens 20, reflected by the grating 30 and after passing through the lens 4 and being reflected by the seminreflector mirror 21 is brought to a focus upon the photocell 23. The apparatus operates in the same way as the apparatus shown in FIG. 6, employing electronic means as shown in either FIG. 4 or FIG. 5.

We claim:

1. Apparatus for measuring displacement, comprising: a scale grating, an index grating, a source of collimated light which is directed onto the scale grating, a photo-electric element positioned to receive light from the index grating, an oscillator means responsive to the oscillator for effecting periodic movement of the index grating in the plane thereof through a distance equal to a constant fraction of a grating spacing to produce an alternating output signal from the photo-electric element, a multiplier arranged to multiply the output of the oscillator with the output of the photo-electric element, a phase comparator for comparing the phase of the output of the multiplier with the output of the oscillator and filter means for preventing signals of frequencies other than that which the oscillator is tuned from reaching the phase comparator.

2. Apparatus as claimed in claim 1, in which the constant fraction of the grating spacing is in the range one half to three quarters.

3. Apparatus as claimed in claim 1 in which the photo-electric element is rigidly secured to the index grating.

4. Apparatus as claimed in claim 3, in which the index grating and photo-electric element are mounted at one end of a leaf spring, the other end of which is clamped to a rigid support and the means for effecting periodic movement of the index grating comprises an electro-magnet confronting the leaf spring.

5. Apparatus as claimed in claim 4, in which the electro-magnet has a polarized core.

6. Apparatus as claimed in claim 1, including a mirror positioned to reflect light onto the scale grating a second time to form an image of the scale grating on the scale grating, said image of the scale grating comprising the index grating and said means for effecting periodic movement of the index grating being adapted to rotationally oscillate the mirror.

7. Apparatus as claimed in claim 1, including a summation circuit having first and second inputs connected to the outputs of the multiplier and the photodetector and its output connected to the phase comparator.

8. Apparatus as claimed in claim 7, in which the filter means comprises two band-pass filters each tuned to the frequency of the oscillator and each connected to a respective input of the summation circuit.

9. Apparatus as claimed in claim 1, in which the filter means comprises a low-pass filter having the output of the multiplier and the photo-electric element connected to its input and having its output connected to the input of the phase comparator.

10. Apparatus as claimed in claim 9, including focusing means for focusing the collimated light from the scale grating on to the mirror which is placed at the focal point of the focusing means, the returning light from the mirror being collimated again by the focusing means before reaching the scale grating for the second time.

11. Apparatus as claimed in claim 9 in which an inclined partially reflecting surface is disposed between the light source and the scale grating whereby light incident on the reverse side of the partially reflecting mirror after passing through the scale grating the second time, is directed on to the photo-electric element.

12. Apparatus as claimed in claim 9 in which the mirror and means for rotationally oscillating the mirror comprise a moving coil galvanometer.

* * * * *